May 17, 1949. B. F. LANGER ET AL 2,470,626
ELECTROMAGNETIC TORQUE RESPONSIVE DEVICE
Filed Aug. 30, 1946 2 Sheets-Sheet 1

WITNESSES:

INVENTORS
Bernard F. Langer and
Kenneth L. Wommack.
BY
Paul E. Friedemann
ATTORNEY May 17, 1949.　　　B. F. LANGER ET AL　　　2,470,626
ELECTROMAGNETIC TORQUE RESPONSIVE DEVICE
Filed Aug. 30, 1946　　　　　　　　　　　　2 Sheets-Sheet 2

WITNESSES:

INVENTORS
Bernard E. Langer and
Kenneth L. Wommack.
BY
Paul E. Friedemann
ATTORNEY Patented May 17, 1949

2,470,626

UNITED STATES PATENT OFFICE 2,470,626

ELECTROMAGNETIC TORQUE RESPONSIVE DEVICE

Bernard F. Langer and Kenneth L. Wommack, Pittsburgh, Pa., assignors to Westinghouse Electric Corporation, East Pittsburgh, Pa., a corporation of Pennsylvania Application August 30, 1946, Serial No. 694,062

3 Claims. (Cl. 73—136)

This invention relates generally to electromagnetic devices and more specifically to devices of this type adaptable for use as the strain responsive elements in strain measuring systems.

More in particular this invention is related to a torque measuring device of the electromagnetic type which utilizes the strain of the test specimen resulting from torque application thereto, to produce an electrical quantity or electrical change, in dependence of the strain, indicative of the torque loading of the test specimen.

In certain of its aspects this invention is related to a copending application of F. W. Godsey, Jr., Serial No. 455,258, filed August 18, 1942, and entitled Power measuring device for rotating shafts, now forfeited.

In certain other of its aspects this invention is related to a copending application of B. F. Langer and F. W. Godsey, Jr., Serial No. 458,378, filed September 15, 1942, and entitled Torque measuring devices for shafts, which matured into Patent Number 2,459,171 on January 18, 1949, both of these applications being assigned to the same assignee as the invention.

Considerable effort has been expended in the past in the development of practical torque and power measuring devices for ascertaining with reasonable accuracy the torque or power being transmitted by a rotatable shaft. These efforts have resulted in a device, hereinafter specially described, involving a variable reluctance rotor secured to the shaft, the magnetic reluctance being variable in dependence of the torque of the shaft, and a stationary electromagnetic flux producing unit, the flux of which links the rotor and is varied by changes in rotor reluctance. Upon the occurrence of strain in the torque transmitting shaft, the rotor reluctance varies and the flux linkage of the rotor and stationary unit changes in substantially proportional amount causing an electrical change in the stationary unit indicative of the shaft torque.

Test data accumulated from both laboratory and commercial applications of the torque measuring device indicates the principles embodied in the present device are sound and that the device when viewed in the light of past attempts is a practical success. However, it has been found that modifications in the basic design are necessary for application of the torque measuring device in certain power transmitting applications. The form the modifications may take depends, of course, upon the requirements of a particular application and for the most part embody size changes to electrically and mechanically fit the device to the specific problem.

The design criterion in devices of this type is to obtain maximum sensitivity or response to the range of shaft deflections resulting from normal working torques. To accomplish this it has been the practice to set the dimensions of all torque sensitive air-gaps controlling rotor reluctance so that variations of approximately 50% in gap length are had at rated torque. As a consequence, in installations where rated torque is occasionally greatly exceeded, there is likelihood that the airgaps will be entirely closed and the members forming the gaps placed under deformative stress, with the result the calibration of the device is changed.

In accordance with the foregoing considerations it is an object of this invention to provide a strain responsive device of the character referred to in which provision is had for transmitting loads above rated load without destroying the calibration of the device.

Another object of this invention is to provide a strain measuring device of the character mentioned wherein means are provided for preventing complete closure of the strain sensitive airgaps.

More specifically it is an object of this invention to provide a strain sensitive apparatus of the class described wherein suitable mechanical provision is had for increasing the mechanical load transmitting capacities of the device upon the occurrence of a predetermined load.

The foregoing statement are merely illustrative of the various aims and objects of this invention. Other objects and advantages will become apparent upon a study of the following disclosure when considered in conjunction with the accompanying drawings, in which:

Fig. 4 is a developed view of a portion of the rotor illustrating a variation of the arrangement shown in Fig. 3.

Figure 1:
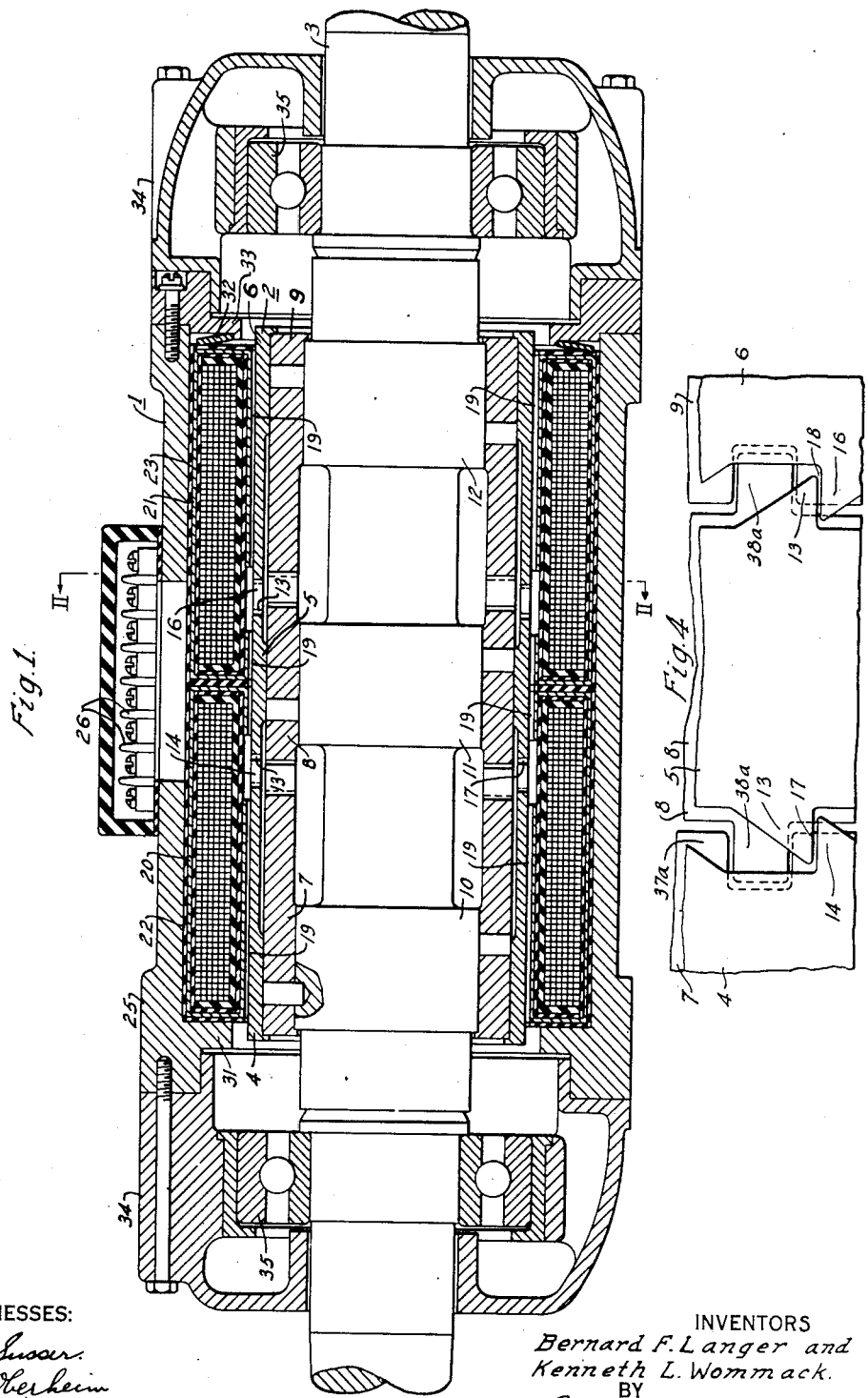
Fig. 1 is a longitudinal cross-sectional view of a torque responsive device embodying the principles of this invention.
Figure 2:
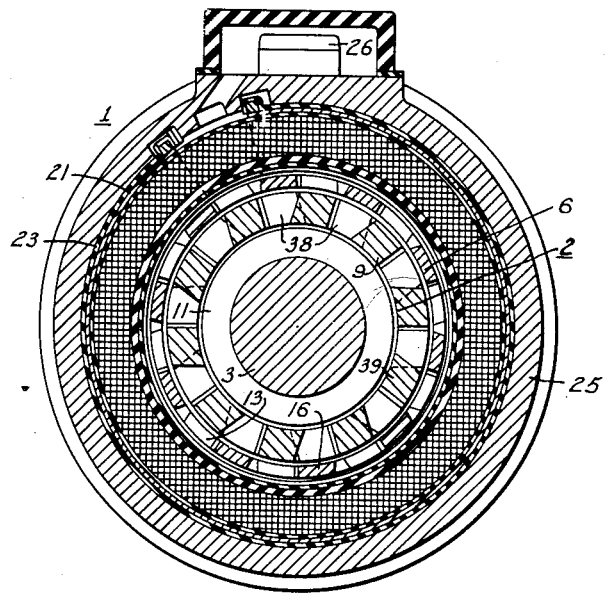
Fig. 2 is a sectional view taken on the line II—II of Fig. 1.

Referring now to Figs. 1 and 2 of the drawing and particularly to Fig. 1 thereof the torque responsive device therein illustrated includes the stationary electromagnetic unit generally denoted by 1 and the magnetizable rotor assembly generally denoted by 2.

The rotor assembly 2 is supported on or secured to a shaft section 3, which may be any suitable shaft of a power transmitting installation, and comprises the three shaft rings 4, 5 and 6 secured upon a similar set of non-magnetic rings 7, 8 and 9 in turn secured upon shaft flanges 10, 11 and 12, the non-magnetic rings serving to magnetically isolate the shaft rings, which are of magnetizable material, from the shaft. The shaft flanges are so designed that a relatively high degree of shaft stiffness exists over the flange sections, that most of the shaft deflection occurs in the reduced shaft regions therebetween over a predetermined gauge length. Thus negligible torsional deflection occurs over the flange surfaces and rigid seats for the shaft rings are afforded.

Figure 3:
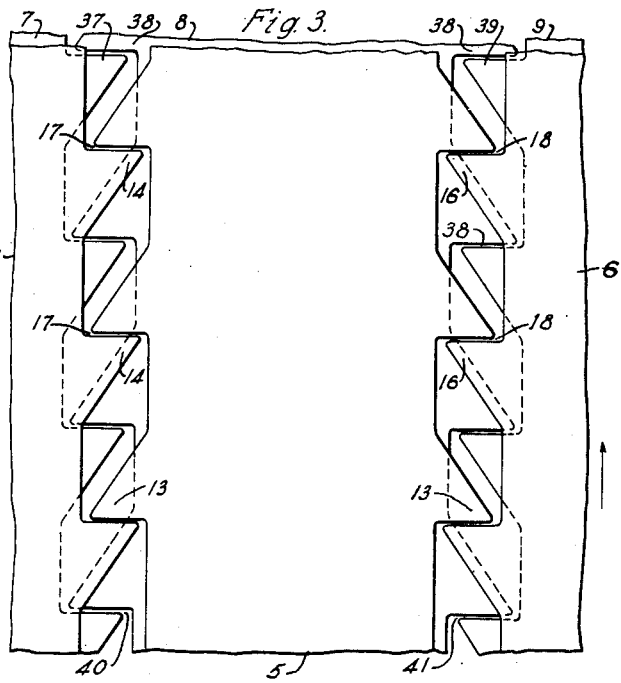
Fig. 3 is a developed view of a portion of the rotor of the torque responsive device.

The central or reference ring 5 (see Fig. 3) is provided with axially extending fingers or teeth 13 which interlock with or overlap the teeth 14 and 15 respectively provided on shaft rings 4 and 6, so that small circumferential airgaps 17 and 18 are formed, respectively, between the teeth 13 and 14 and the teeth 13 and 16. By way of example only, these circumferential airgaps may be of the order of 0.005 of an inch but are shown longer as a matter of drawing convenience. The arrangement of airgaps 17 and 18 is such that upon transmission of torque from left to right of the shaft in a clockwise direction as viewed in Fig. 1 and as indicated by the arrows in Fig. 3, the airgaps 17 are increased in length while the airgaps 18 are decreased in length. As a consequence the reluctance of the rotor sections changes from a condition of reluctance balance at zero shaft torque to a condition of unbalanced reluctance in dependence of the magnitude of shaft torque. For the assumed direction of torque transmission and the specific rotor construction, the reluctance between reference ring 5 and left ring 4 increases, since the airgaps 17 increase, while the reluctance between reference ring 5 and right ring 6 decreases because airgaps 18 decrease. The departure from a condition of reluctance equilibrium of the two rotor sections is in opposite directions resulting in an overall higher sensitivity to torque than either rotor section alone could provide, other things being equal.

The stationary electromagnetic unit 1 comprises two annular windings 20 and 21 respectively concentrically arranged about the two rotor sections. Each winding is enclosed in a magnetic housing 22 and 23 respectively of the form of an incomplete annulus as seen in Fig. 2. Each of the magnetic housings is provided with inwardly flanged portions which are concentrically disposed adjacent the smooth peripheries of the shaft rings 4, 5 and 6 so that small radial airgaps 19 are formed therebetween across which the magnetic flux may link the stationary and rotating elements of the strain responsive device. Conventionally the windings may be connected (not shown) in adjacent legs of a bridge circuit which is usually electrically balanced for zero shaft load. Windings 20 and 21 are electrically insulated from the housings 22 and 23 and housings 22 and 23 are in turn electrically insulated from the cylindrical support 25 in which they are secured and through which electrical connections to the windings are brought out at terminal strip 26. Housings 22 and 23 are electrically insulated from each other by a washer 30 disposed therebetween and are securely clamped in housing 25 between the shoulder 31 at one extremity and the spring washer 32 backed up by a clamping ring 33 at the other end. End bells 34 which bolt to the ends of cylindrical housing 25 carry bearings 35 in which the shaft 3 is journaled.

In the design of the torque responsive devices the shaft is made flexible enough so that the circumferential airgaps 17 and 18 between the teeth will increase or decrease, depending upon the direction of torque transmission, by about 50% when rated torque is applied. For the most part the shaft flexibility may be determined by the cross-sectional dimensions thereof between the shaft flanges, this dimension preferably being less than other points on the shaft so that maximum stressing occurs over the two shaft gauge lengths. When the shaft is so designed, however, and the rotor teeth set to produce about 50% airgap variation at rated torque, loads in excess of 200% of rated torque result in closing of the airgaps and the magnetic teeth 13, 14 and 16 forming the circumferential gaps are stressed. Since the teeth are relatively weak mechanically for electrical and metallurgical reasons, slight stressing of the teeth may be detrimental in that calibration might be altered. In dynamometer applications torque measuring devices must be able to transmit as much as five times rated torques under certain operating conditions, although torque measurements are ordinarily only required over the normal working range. As thus far described the torque responsive device would have to be seriously derated to transmit the peak loads.

Rather than this the nonmagnetic rings 7, 8 and 9 are made mechanically strong and equipped with interlocking teeth 37, 38 and 39 of similar configuration and similarly disposed as the active magnetic teeth 13, 14 and 16. The nonmagnetic circumferential gaps 40 and 41, however, are of lesser length than the active magnetic gaps 17 and 18 and as a consequence the nonmagnetic gap faces contact at high loads before the magnetic circumferential gaps close. The excess loading is therefore taken up by the teeth on the nonmagnetic rings. It will be noted that the nonmagnetic teeth contact only in the closing direction of the circumferential airgaps 17 and 18, since, the calibration is not disturbed by excessive increasing of the gap lengths, provided of course that the shaft's elastic limit is not exceeded.

For applications where there is a possibility of over stressing the shaft gauge sections, the nonmagnetic rings may be equipped with square teeth 37a, 38a and 39a as shown in Fig. 4. These teeth are so interlocked that relative circumferential movement in either direction, if sufficiently great will cause the confronting tooth faces to contact. Hence, the amount of torsional deflection that may occur over the gauge lengths of shaft for either rotational direction is limited by tooth spacing. Here again the teeth will be so set that closure of the active airgaps 17 and 18 is obviated.

In general the operation of the torque responsive device is as follows:

Upon energization of the windings 20 and 21 with alternating current fluxes associated with each winding flow in the respective housings and link the rotor across the radial airgaps. In the rotor this flux circulates between the respective rings 4 and 6 and the reference ring 5 through the associated fingers or teeth and circumferential airgaps. When the shaft is unstrained the reluctances of the rotor sections theoretically balance and the winding voltages are the same. However, when the shaft is under torsional strain, the reluctances of the two rotor sections change in opposite directions due to opposite changes in the circumferential airgaps 17 and 18, the reluctance of the left rotor section as viewed increasing and the reluctance of the right rotor section decreasing. This results in a decrease in flux linkage of winding 20 and a corresponding increase of flux linking winding 21; producing opposite changes in winding impedance. The resulting voltage unbalance between the windings is an indication of the shaft torque. Throughout this operating procedure the teeth of the nonmagnetic rings do not contact. Hence there is no interference with torque response over the normal working range of the active magnetic gaps. However upon the occurrence of abnormal torques the nonmagnetic gaps close taking up the excess mechanical load and protecting the active magnetic teeth.

The foregoing disclosure and the showings made in the drawings are merely illustrative of the principles of this invention and are not to be interpreted in a limiting sense. The only limitations are to be determined from the scope of the appended claims.

We claim as our invention:

1. Strain responsive apparatus comprising, in combination, a stationary electromagnetic flux producing unit, a rotor assembly including a pair of spaced magnetic rings having projections disposed in interlocking relation so that small magnetic airgaps are formed therebetween, said rings being resiliently connected to permit relative movement in a direction to vary said magnetic airgaps, said rotor being disposed to be linked by the flux produced by said electromagnetic unit, and means of nonmagnetic material disposed in said rotor and being constructed and arranged to form gaps of lesser dimensions therebetween than said magnetic airgaps to limit the range of movement of said rings and, hence, the variation of said magnetic airgaps.

2. Strain responsive apparatus comprising, in combination, a stationary electromagnetic flux producting unit, a rotor assembly including a pair of spaced magnetic rings having axially disposed teeth arranged in interlocking relation so that small circumferential magnetic airgaps are formed therebetween, said rings being resiliently connected to permit relative circumferential movement in a direction to vary said magnetic airgaps, said rotor being disposed to be linked by the flux produced by said electromagnetic unit, a second pair of rings of nonmagnetic material secured with respect to said magnetic rings and having axially disposed teeth arranged in interlocking relation similar to said magnetic rings but forming gaps of smaller dimension than the magnetic airgaps formed by said magnetic rings, so that engagement of the interlocking teeth of said rings of nonmagnetic material prevents engagement of the interlocking teeth of said magnetic rings.

3. Strain measuring apparatus comprising in combination, a stationary electromagnetic flux producing unit having a pair of annular coaxially disposed windings, a rotor assembly having three axially spaced rings of magnetic material concentrically disposed of said windings and arranged at equal distances so that one of said rings lies centrally between said windings and the remaining rings each lie approximately at an outer extremity of the corresponding one of said windings, axial projections on each of said rings arranged in interlocking relation to form small circumferential magnetic airgaps therebetween, the arrangement being such that upon application of torque to said rotor the magnetic airgaps associated with one outside ring and the central ring increase while the magnetic airgaps associated with the other outside ring and the central ring decrease, said rotor being arranged in flux linkage with the stationary electromagnetic unit, a set of three rings of nonmagnetic material, having interlocking axially projecting teeth forming gaps of smaller dimension than said magnetic airgaps, said nonmagnetic rings being secured to said magnetic rings and the gaps thereof closing upon the occurrence of torsional deflection of a predetermined magnitude, to prevent closure of the corresponding set of magnetic airgaps.

BERNARD F. LANGER.
KENNETH L. WOMMACK.

REFERENCES CITED

The following references are of record in the file of this patent:

UNITED STATES PATENTS

| Number | Name | Date |
| --- | --- | --- |
| 98,205 | Sutton | Dec. 21, 1869 |
| 1,204,292 | McCormick | Nov. 7, 1916 |
| 2,365,565 | Langer | Dec. 19, 1944 |
| 2,403,952 | Ruge | July 16, 1946 |